United States Patent [19]

Iizuka

[11] Patent Number: 4,943,146
[45] Date of Patent: Jul. 24, 1990

[54] READING LENS SYSTEM
[75] Inventor: Takashi Iizuka, Tokyo, Japan
[73] Assignee: Asahi Kogaku Kogyo Kabushiki Kaisha, Tokyo, Japan
[21] Appl. No.: 420,497
[22] Filed: Oct. 10, 1989
[30] Foreign Application Priority Data Oct. 12, 1988 [JP] Japan .............................. 63-133113[U]
Sep. 14, 1989 [JP] Japan .................................. 1-238741

[51] Int. Cl.⁵ ................................................ G02B 9/36
[52] U.S. Cl. .................................................... 350/471
[58] Field of Search ......................... 350/469, 470, 471

[56] References Cited

U.S. PATENT DOCUMENTS

| | | | |
|---|---|---|---|
| 2,983,193 | 5/1961 | Schade | 350/471 |
| 3,136,840 | 6/1964 | Buzawa | 350/471 |
| 4,057,329 | 11/1977 | Fleischman | 350/471 |
| 4,377,326 | 3/1983 | Kobayashi | 350/471 |
| 4,784,480 | 11/1988 | Yokota et al. | 350/471 |
| 4,863,251 | 9/1989 | Herloski et al. | 350/471 |

FOREIGN PATENT DOCUMENTS 50-62631  5/1975  Japan .
59-90810  5/1984  Japan .
60-181716 9/1985  Japan .
63-75720  4/1988  Japan .

*Primary Examiner*—Scott J. Sugarman
*Attorney, Agent, or Firm*—Sughrue, Mion, Zinn, Macpeak & Seas

[57]  ABSTRACT

A reading lens system comprises, in order from the object side, a positive meniscus first lens element having a convex surface directed toward the object, a positive meniscus second lens element having a convex surface directed toward the object, a negative meniscus third lens element having a convex surface directed toward the object, a negative meniscus fourth lens element having a concave surface directed toward the object, a positive meniscus fifth lens element having a concave surface directed toward the object, and a positive sixth lens element. The second and third lens elements are cemented and the fourth and fifth lens elements are also cemented to provide an overall system of four-unit-six-element composition, with the lens system satisfying a number of conditions to obtain a lens having an F number of about 1:4.0 and a half viewing angle of not greater than 20° and which is capable of efficient compensation for aberrations, in particular astigmatism and chromatic aberrations.

5 Claims, 4 Drawing Sheets

READING LENS SYSTEM

BACKGROUND OF THE INVENTION

The present invention relates to a reading lens system suitable for use with facsimiles, image scanners and like apparatus.

Lens systems used with facsimiles, image scanners and like apparatus must have a resolving power of approximately 7 μm on the image side and hence are required to provide an extremely good contrast at high frequencies. Further, in order to minimize the loss of light in an inner peripheral portion of an image circle formed by the reading lens system, a nearly 100% aperture efficiency is needed. In addition, it is necessary to achieve satisfactory compensation for distortion. To meet these requirements, Gauss type lenses are conventionally used, as described, e.g., in Unexamined Published Japanese Patent Application Nos. 50-62631, 59-90810, 60-181716 and 63-75720.

A problem with the conventional Gauss type lenses, which are used with an F number on the order of 1:4.0 and a half viewing angle of about 20°, is that their performance in a sagittal direction is not given as much consideration as in a meridional direction. If one wants to improve the overall image quality by a suitable method such as increasing the reading density in a sagittal direction, good lens performance is required in both meridional and sagittal directions. However, this requirement has not been completely met by prior art lens systems.

SUMMARY OF THE INVENTION

It is an object of the present invention to solve the above-mentioned problem, and it is a principal object to provide a reading lens system of high performance that has an F number of about 1:4.0 and a half viewing angle of not greater than 20° and which is capable of efficient compensation for aberrations, in particular astigmatism and chromatic aberrations.

The reading lens system of the present invention comprises, in order from the object side, a positive meniscus first lens element having a convex surface directed toward the object, a positive meniscus second lens element having a convex surface directed toward the object, a negative meniscus third lens element having a convex surface directed toward the object, a negative meniscus fourth lens element having a concave surface directed toward the object, a positive meniscus fifth lens element having a concave surface directed toward the object, and a positive sixth lens element. The second and third lens elements are cemented and the fourth and fifth lens elements are also cemented to provide an overall system of four-unit-six-element composition, with the lens system satisfying the following conditions:

(1) $0.28 < d_3 < 0.35$ $$0.28 < d_3 < 0.35 \tag{1}$$

$$1.10 < \frac{r_5 + |r_6|}{d_5} < 1.80 \tag{2}$$

$$0.80 < \frac{r_3 + |r_8|}{d_3 + d_4 + d_5 + d_6} < 1.40 \tag{3}$$

$$0.70 < \frac{r_3 + r_5}{r_4} < 1.50 \tag{4}$$

$$0.80 < \frac{|r_6| + |r_8|}{|r_7|} < 1.30 \tag{5}$$

where $r_i$ is the radius of curvature of the ith surface, and $d_i$ is the distance between the ith and the (i+1)th surfaces.

BRIEF DESCRIPTION OF THE DRAWINGS

The invention will be more clearly understood with reference to the following description in conjunction with the accompanying drawings, wherein.

DETAILED DESCRIPTION OF THE INVENTION

Figure 1:
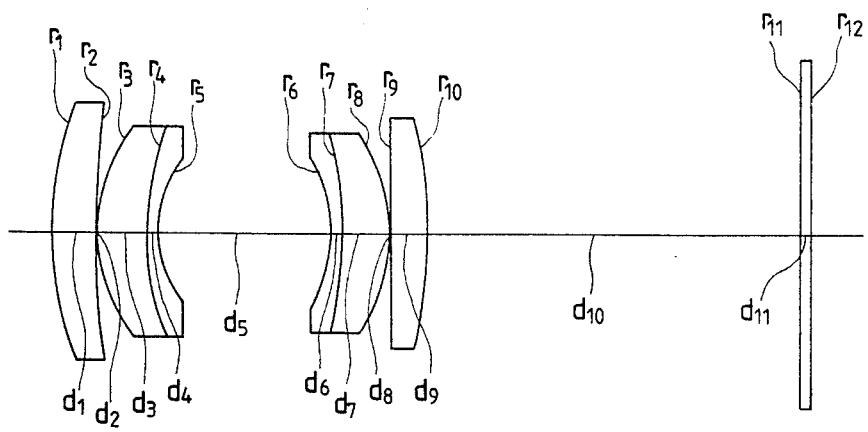
FIG. 1 is a simplified cross-sectional view of the lens system constructed according to Example 1 of the present invention.
Figure 2:
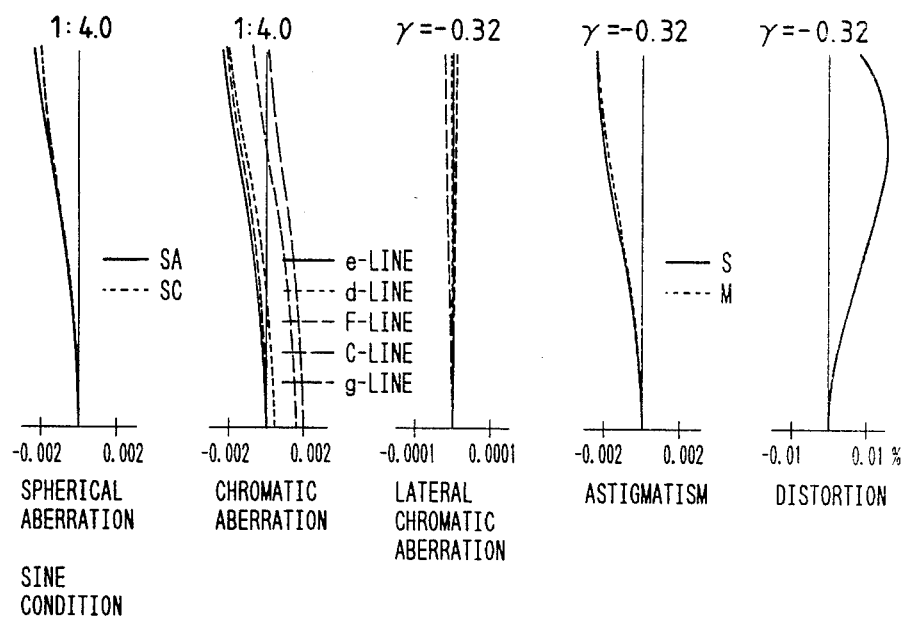
FIG. 2 is a graph plotting the aberration curves obtained with the lens system of Example 1.
Figure 3:
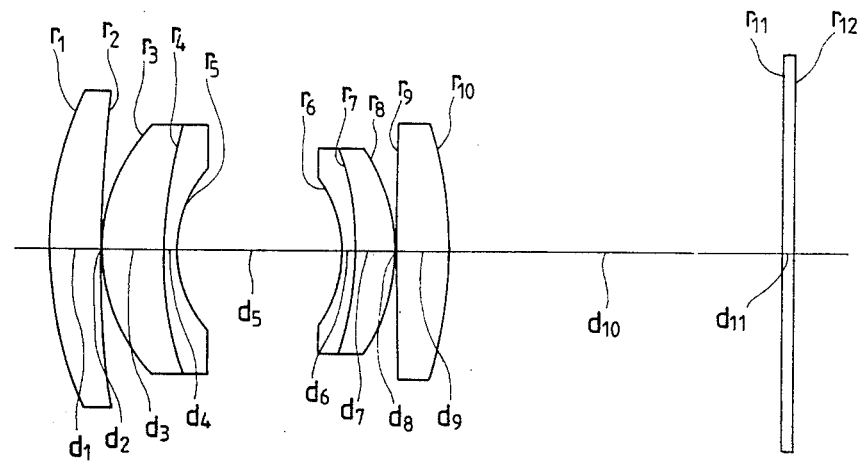
FIG. 3 is a simplified cross-sectional view of the lens system constructed according to Example 2 of the present invention.
Figure 4:
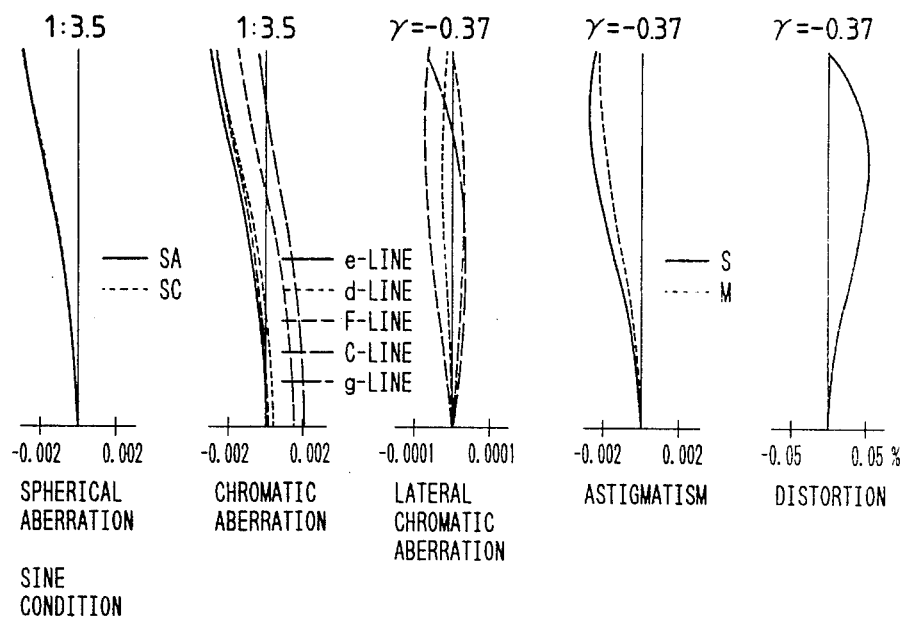
FIG. 4 is a graph plotting the aberration curves obtained with the lens system of Example 2.
Figure 5:
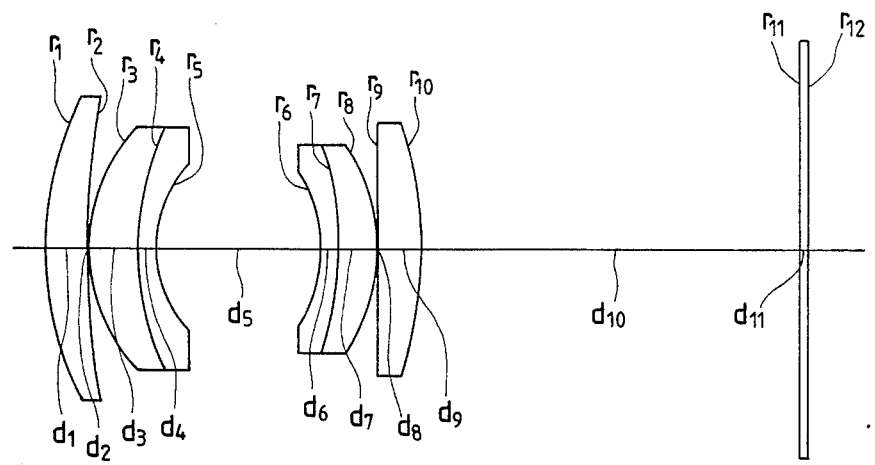
FIG. 5 is a simplified cross-sectional view of the lens system constructed according to Example 3 of the present invention.
Figure 6:
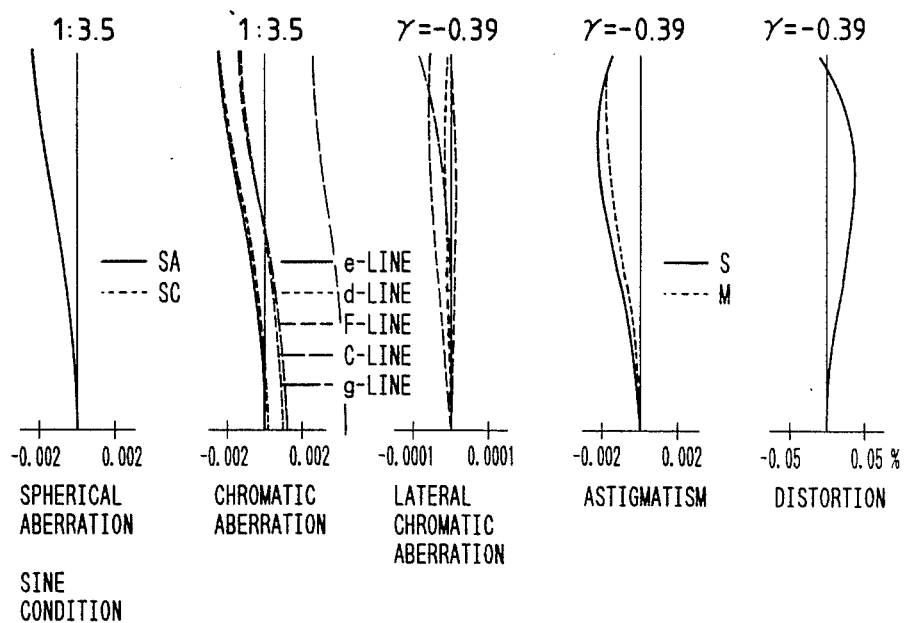
FIG. 6 is a graph plotting the aberration curves obtained with the lens system of Example 3.
Figure 7:
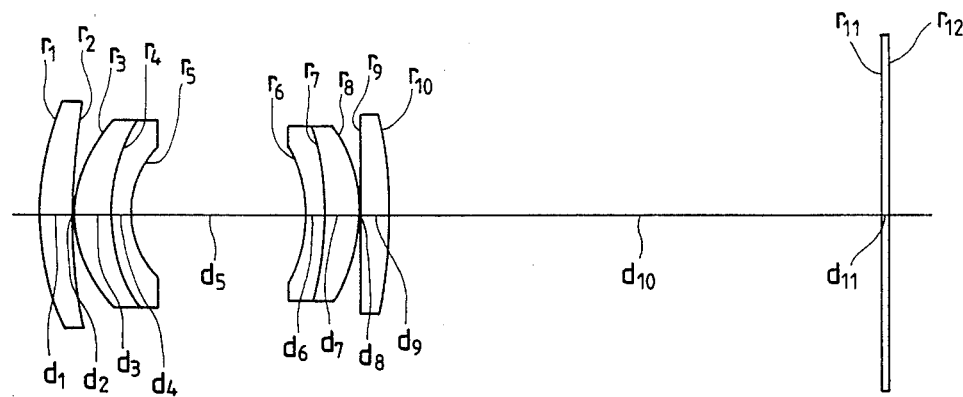
FIG. 7 is a simplified cross-sectional view of the lens system constructed according to Example 4 of the present invention.
Figure 8:
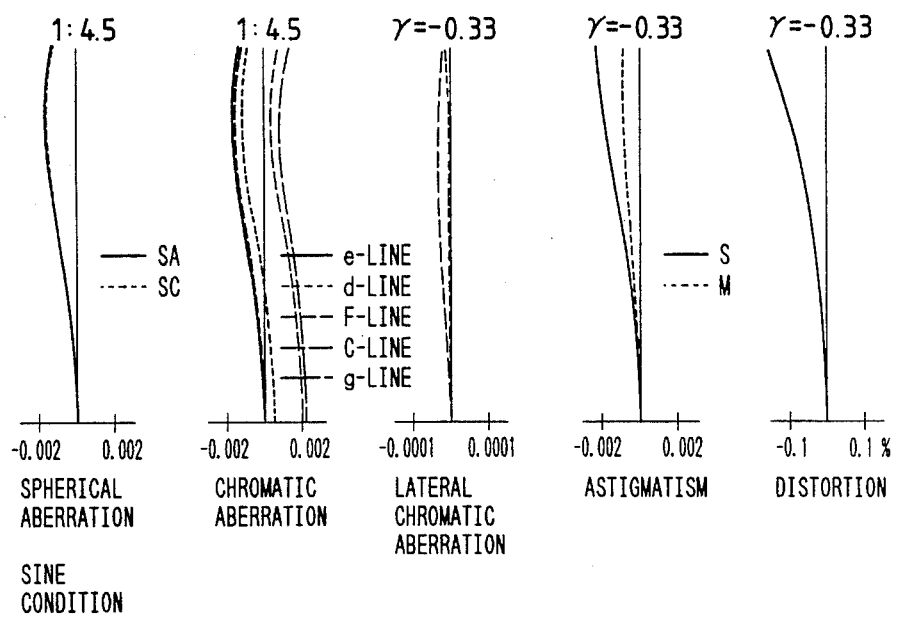
FIG. 8 is a graph plotting the aberration curves obtained with the lens system of Example 4.

With reference to the conditions (1)-(5) set forth above, condition (1) must be satisfied in order to achieve effective compensation for astigmatism. If the upper limit of this condition is exceeded, astigmatism will increase at a large image height. If the lower limit of this condition is not met, astigmatism will increase at a medium image height. The lens system of the present invention intends to compensate for aberrations in a comparatively narrow range of viewing angles, so the value of $d_5$ is made large relative to conventional systems. In order to attain even better performance, $d_3$ desirably satisfies the condition $0.30 < d_5 < 0.34$.

Condition (2) must be satisfied in order to achieve efficient compensation for spherical aberration and coma. If the upper limit of this condition is exceeded, coma flare will decrease but on the other hand, spherical aberration will be undercompensated. If the lower limit of this condition is not reached, coma flare will increase. If condition (2) is satisfied, the second surface of the third lens element ($r_5$) and the first surface of the fourth lens element ($r_6$) can be arranged in a more concentric fashion with respect to the diaphragm stop, thereby attaining good performance at a large image height. To attain even better performance, the following condition is desirably satisfied:

$$1.20 < \frac{r_5 + |r_6|}{d_5} < 1.70$$

Like condition (2), condition (3) must be satisfied in order to achieve efficient compensation for spherical aberration and coma. If the upper limit of this condition is exceeded, spherical aberration will be overcompensated. If the lower limit of this condition is not reached, coma flare will increase. In order to effect even more efficient compensation, the following condition is desirably satisfied:

$$0.90 < \frac{r_3 + |r_6|}{d_3 + d_4 + d_5 + d_6} < 1.30$$

Conditions (4) and (5) must be satisfied in order to effect efficient compensation for chromatic aberrations. By cementing two lens elements of weak power having large differences in dispersion index, not only a longitudinal but also a lateral chromatic aberration can be satisfactorily compensated. If the upper limit of either condition (4) or (5) is exceeded, difficulty is involved in compensating for longitudinal chromatic aberration. If the lower limit of either condition is not reached, lateral chromatic aberration will increase.

Four examples of the present invention are described below with reference to data tables, in which f is the focal length of the overall system at the e-line, $F_{10}$ is the F number, m is the magnification, $r_i$ is the radius of curvature of the ith surface, $d_i$ is the distance between the ith and (i+1)th surfaces, $n_i$ is the refractive index of the ith lens at the e-line, and $\nu_i$ is the Abbe number of the ith lens at the e-line. The data tables include the cover glass of a CCD (marked with asterisks).

EXAMPLE 1

| f = 1 | | $F_{NO}$: 4.0 | | m = −0.126 | | |
|---|---|---|---|---|---|---|
| $r_1$ | 0.641 | $d_1$ | 0.082 | $n_1$ | 1.71615 | $\nu_1$ | 53.6 |
| $r_2$ | 1.724 | $d_2$ | 0.002 | | | |
| $r_3$ | 0.299 | $d_3$ | 0.093 | $n_2$ | 1.77621 | $\nu_2$ | 49.3 |
| $r_4$ | 0.493 | $d_4$ | 0.023 | $n_3$ | 1.72311 | $\nu_3$ | 29.3 |
| $r_5$ | 0.214 | $d_5$ | 0.327 | | | |
| $r_6$ | −0.263 | $d_6$ | 0.023 | $n_4$ | 1.72311 | $\nu_4$ | 29.3 |
| $r_7$ | −0.626 | $d_7$ | 0.083 | $n_5$ | 1.77621 | $\nu_5$ | 49.3 |
| $r_8$ | −0.327 | $d_8$ | 0.002 | | | |
| $r_9$ | 12.685 | $d_9$ | 0.068 | 6 | 1.71615 | $\nu_6$ | 53.6 |
| $r_{10}$ | −0.852 | $d_{10}$ | 0.691 | | | |
| $r_{11}$ | ∞ | $d_{11}$ | 0.016 | $n_7$ | 1.51825 | $\nu_7$ | 63.9 } * |
| $r_{12}$ | ∞ | | | | | |

(1) $d_3 = 0.33$ (2) $\dfrac{r_5 + |r_6|}{d_5} = 1.46$ (3) $\dfrac{r_3 + |r_8|}{d_3 + d_4 + d_5 + d_6} = 1.15$ (4) $\dfrac{r_3 + r_5}{r_4} = 1.04$ (5) $\dfrac{|r_6| + |r_8|}{|r_7|} = 0.94$

EXAMPLE 2

| f = 1 | | $F_{NO}$: 3.5 | | m = −0.112 | | |
|---|---|---|---|---|---|---|
| $r_1$ | 0.688 | $d_1$ | 0.095 | $n_1$ | 1.71615 | $\nu_1$ | 53.6 |
| $r_2$ | 1.944 | $d_2$ | 0.003 | | | |
| $r_3$ | 0.333 | $d_3$ | 0.113 | $n_2$ | 1.77620 | $\nu_2$ | 49.3 |
| $r_4$ | 0.741 | $d_4$ | 0.027 | $n_3$ | 1.72311 | $\nu_3$ | 29.3 |
| $r_5$ | 0.238 | $d_5$ | 0.305 | | | |
| $r_6$ | −0.253 | $d_6$ | 0.027 | $n_4$ | 1.72311 | $\nu_4$ | 29.3 |
| $r_7$ | −0.545 | $d_7$ | 0.073 | $n_5$ | 1.77620 | $\nu_5$ | 49.3 |
| $r_8$ | −0.333 | $d_8$ | 0.003 | | | |
| $r_9$ | 6.098 | $d_9$ | 0.098 | $n_6$ | 1.71615 | $\nu_6$ | 53.6 |
| $r_{10}$ | −0.784 | $d_{10}$ | 0.621 | | | |
| $r_{11}$ | ∞ | $d_{11}$ | 0.021 | $n_7$ | 1.51825 | $\nu_7$ | 63.9 } * |
| $r_{12}$ | ∞ | | | | | |

(1) $d_5 = 0.31$ (2) $\dfrac{r_5 + |r_6|}{d_5} = 1.61$ (3) $\dfrac{r_3 + |r_8|}{d_3 + d_4 + d_5 + d_6} = 1.22$ (4) $\dfrac{r_3 + r_5}{r_4} = 0.77$ (5) $\dfrac{|r_6| + |r_8|}{|r_7|} = 1.08$

EXAMPLE 3

| f = 1 | | $F_{NO}$: 3.5 | | m = −0.168 | | |
|---|---|---|---|---|---|---|
| $r_1$ | 0.601 | $d_1$ | 0.080 | $n_1$ | 1.77620 | $\nu_1$ | 49.3 |
| $r_2$ | 1.580 | $d_2$ | 0.002 | | | |
| $r_3$ | 0.324 | $d_3$ | 0.090 | $n_2$ | 1.77620 | $\nu_2$ | 49.3 |
| $r_4$ | 0.528 | $d_4$ | 0.035 | $n_3$ | 1.76859 | $\nu_3$ | 26.3 |
| $r_5$ | 0.231 | $d_5$ | 0.305 | | | |
| $r_6$ | −0.263 | $d_6$ | 0.035 | $n_4$ | 1.76859 | $\nu_4$ | 26.3 |
| $r_7$ | −0.528 | $d_7$ | 0.068 | $n_5$ | 1.77620 | $\nu_5$ | 49.3 |
| $r_8$ | −0.345 | $d_8$ | 0.002 | | | |
| $r_9$ | −35.258 | $d_9$ | 0.083 | $n_6$ | 1.77620 | $\nu_6$ | 49.3 |
| $r_{10}$ | −0.724 | $d_{10}$ | 0.704 | | | |
| $r_{11}$ | ∞ | $d_{11}$ | 0.015 | $n_7$ | 1.51825 | $\nu_7$ | 63.9 } * |
| $r_{12}$ | ∞ | | | | | |

(1) $d_5 = 0.31$ (2) $\dfrac{r_5 + |r_6|}{d_5} = 1.62$ (3) $\dfrac{r_3 + |r_8|}{d_3 + d_4 + d_5 + d_6} = 1.25$ (4) $\dfrac{r_3 + r_5}{r_4} = 1.05$ (5) $\dfrac{|r_6| + |r_8|}{|r_7|} = 1.15$

EXAMPLE 4

| f = 1 | | $F_{NO}$: 4.5 | | m = −0.333 | | |
|---|---|---|---|---|---|---|
| $r_1$ | 0.476 | $d_1$ | 0.065 | $n_1$ | 1.66103 | $\nu_1$ | 57.1 |
| $r_2$ | 1.264 | $d_2$ | 0.002 | | | |
| $r_3$ | 0.238 | $d_3$ | 0.066 | $n_2$ | 1.66103 | $\nu_2$ | 57.1 |
| $r_4$ | 0.300 | $d_4$ | 0.038 | $n_3$ | 1.72311 | $\nu_3$ | 29.3 |
| $r_5$ | 0.166 | $d_5$ | 0.327 | | | |
| $r_6$ | −0.259 | $d_6$ | 0.038 | $n_4$ | 1.72311 | $\nu_4$ | 29.3 |
| $r_7$ | −0.508 | $d_7$ | 0.064 | $n_5$ | 1.66103 | $\nu_5$ | 57.1 |
| $r_8$ | −0.276 | $d_8$ | 0.002 | | | |
| $r_9$ | −15.407 | $d_9$ | 0.056 | $n_6$ | 1.66103 | $\nu_6$ | 57.1 |
| $r_{10}$ | −0.777 | $d_{10}$ | 0.912 | | | |
| $r_{11}$ | ∞ | $d_{11}$ | 0.013 | $n_7$ | 1.51825 | $\nu_7$ | 63.9 } * |
| $r_{12}$ | ∞ | | | | | |

(1) $d_5 = 0.33$ (2) $\dfrac{r_5 + |r_6|}{d_5} = 1.30$

-continued (3) $\dfrac{r_3 + |r_8|}{d_3 + d_4 + d_5 + d_6} = 0.97$ (4) $\dfrac{r_3 + r_5}{r_4} = 1.35$ (5) $\dfrac{|r_6| + |r_8|}{|r_7|} = 1.05$ As described in the foregoing, the reading lens system of the present invention is of a four-unit-six-element composition that has an F number of 1:4.0 and a half viewing angle not greater than 20°. Since it satisfies the conditions set forth above, the lens system is capable of efficient compensation for aberrations, in particular astigmatism and chromatic aberrations.

What is claimed is:

1. A reading lens system comprising, in order from the object side, a positive meniscus first lens element having a convex surface directed toward the object, a positive meniscus second lens element having a convex surface directed toward the object, a negative meniscus third lens element having a convex surface directed toward the object, a negative meniscus fourth lens element having a concave surface directed toward the object, a positive meniscus fifth lens element having a concave surface directed toward the object, and a positive sixth lens element, said second and third lens elements being cemented and said fourth and fifth lens elements being also cemented to provide an overall system of a four-unit-six-element composition, the improvement wherein said lens system satisfies the following conditions:

(1) $0.28 < d_5 < 0.35$ $$0.28 < d_3 < 0.35 \quad (1)$$

$$1.10 < \dfrac{r_5 + |r_6|}{d_5} < 1.80 \quad (2)$$

$$0.80 < \dfrac{r_3 + |r_8|}{d_3 + d_4 + d_5 + d_6} < 1.40 \quad (3)$$

$$0.70 < \dfrac{r_3 + r_5}{r_4} < 1.50 \quad (4)$$

$$0.80 < \dfrac{|r_6| + |r_8|}{|r_7|} < 1.30 \quad (5)$$

where $r_i$ is the radius of curvature of the ith surface, and $d_i$ is the distance between the ith and the (i+1)th surfaces and f is the overall focal length of the system when f takes a value of 1 (one).

2. A lens system according to claim 1, constructed according to the following table:

| | | | $f = 1$ | $F_{NO}$1: 4.0 | $m = -0.126$ | |
|---|---|---|---|---|---|---|
| $r_1$ | 0.641 | $d_1$ | 0.082 | $n_1$ | 1.71615 | $\nu_1$ | 53.6 |
| $r_2$ | 1.724 | $d_2$ | 0.002 | | | |
| $r_3$ | 0.299 | $d_3$ | 0.093 | $n_2$ | 1.77621 | $\nu_2$ | 49.3 |
| $r_4$ | 0.493 | $d_4$ | 0.023 | $n_3$ | 1.72311 | $\nu_3$ | 29.3 |
| $r_5$ | 0.214 | $d_5$ | 0.327 | | | |
| $r_6$ | −0.263 | $d_6$ | 0.023 | $n_4$ | 1.72311 | $\nu_4$ | 29.3 |
| $r_7$ | −0.626 | $d_7$ | 0.083 | $n_5$ | 1.77621 | $\nu_5$ | 49.3 |
| $r_8$ | −0.327 | $d_8$ | 0.002 | | | |
| $r_9$ | 12.685 | $d_9$ | 0.068 | $n_6$ | 1.71615 | $\nu_6$ | 53.6 |
| $r_{10}$ | −0.825 | $d_{10}$ | 0.691 | | | |
| $r_{11}$ | ∞ | $d_{11}$ | 0.016 | $n_7$ | 1.51825 | $\nu_7$ | 63.9 |
| $r_{12}$ | ∞ | | | | | |

(1) $d_5 = 0.33$ (2) $\dfrac{r_5 + |r_6|}{d_5} = 1.46$ (3) $\dfrac{r_3 + |r_8|}{d_3 + d_4 + d_5 + d_6} = 1.15$ (4) $\dfrac{r_3 + r_5}{r_4} = 1.04$ (5) $\dfrac{|r_6| + |r_8|}{|r_7|} = 0.94$.

3. A lens system according to claim 1, constructed according to the following table:

| | | | $f = 1$ | $F_{NO}$1: 3.5 | $m = -0.112$ | |
|---|---|---|---|---|---|---|
| $r_1$ | 0.688 | $d_1$ | 0.095 | $n_1$ | 1.71615 | $\nu_1$ | 53.6 |
| $r_2$ | 1.944 | $d_2$ | 0.003 | | | |
| $r_3$ | 0.333 | $d_3$ | 0.113 | $n_2$ | 1.77620 | $\nu_2$ | 49.3 |
| $r_4$ | 0.741 | $d_4$ | 0.027 | $n_3$ | 1.72311 | $\nu_3$ | 29.3 |
| $r_5$ | 0.238 | $d_5$ | 0.305 | | | |
| $r_6$ | −0.253 | $d_6$ | 0.027 | $n_4$ | 1.72311 | $\nu_4$ | 29.3 |
| $r_7$ | −0.545 | $d_7$ | 0.073 | $n_5$ | 1.77620 | $\nu_5$ | 49.3 |
| $r_8$ | −0.333 | $d_8$ | 0.003 | | | |
| $r_9$ | 6.098 | $d_9$ | 0.098 | $n_6$ | 1.71615 | $\nu_6$ | 53.6 |
| $r_{10}$ | −0.784 | $d_{10}$ | 0.621 | | | |
| $r_{11}$ | ∞ | $d_{11}$ | 0.021 | $n_7$ | 1.51825 | $\nu_7$ | 63.9 |
| $r_{12}$ | ∞ | | | | | |

(1) $d_5 = 0.31$ (2) $\dfrac{r_5 + |r_6|}{d_5} = 1.61$ (3) $\dfrac{r_3 + |r_8|}{d_3 + d_4 + d_5 + d_6} = 1.22$ (4) $\dfrac{r_3 + r_5}{r_4} = 1.77$ (5) $\dfrac{|r_6| + |r_8|}{|r_7|} = 1.08$.

4. A lens system according to claim 1, constructed according to the following table:

| | | | $f = 1$ | $F_{NO}$1: 3.5 | $m = -0.168$ | |
|---|---|---|---|---|---|---|
| $r_1$ | 0.601 | $d_1$ | 0.080 | $n_1$ | 1.77620 | $\nu_1$ | 49.3 |
| $r_2$ | 1.580 | $d_2$ | 0.002 | | | |
| $r_3$ | 0.324 | $d_3$ | 0.090 | $n_2$ | 1.77620 | $\nu_2$ | 49.3 |
| $r_4$ | 0.528 | $d_4$ | 0.035 | $n_3$ | 1.76859 | $\nu_3$ | 26.3 |
| $r_5$ | 0.231 | $d_5$ | 0.305 | | | |
| $r_6$ | −0.263 | $d_6$ | 0.035 | $n_4$ | 1.76859 | $\nu_4$ | 26.3 |
| $r_7$ | −0.528 | $d_7$ | 0.068 | $n_5$ | 1.77620 | $\nu_5$ | 49.3 |
| $r_8$ | −0.345 | $d_8$ | 0.002 | | | |
| $r_9$ | −35.258 | $d_9$ | 0.083 | $n_6$ | 1.77620 | $\nu_6$ | 49.3 |
| $r_{10}$ | −0.724 | $d_{10}$ | 0.704 | | | |
| $r_{11}$ | ∞ | $d_{11}$ | 0.015 | $n_7$ | 1.51825 | $\nu_7$ | 63.9 |
| $r_{12}$ | ∞ | | | | | |

(1) $d_5 = 0.31$ (2) $\dfrac{r_5 + |r_6|}{d_5} = 1.62$ (3) $\dfrac{r_3 + |r_8|}{d_3 + d_4 + d_5 + d_6} = 1.25$ (4) $\dfrac{r_3 + r_5}{r_4} = 1.05$ -continued $$(5) \frac{|r_6| + |r_8|}{|r_7|} = 1.15.$$

5. A lens system according to claim 1, constructed according to the following table:

| | f = 1 | | $F_{NO}$1: 4.5 | | m = −0.333 | |
|---|---|---|---|---|---|---|
| $r_1$ | 0.476 | $d_1$ | 0.065 | $n_1$ | 1.66103 | $\nu_1$ 57.1 |
| $r_2$ | 1.264 | $d_2$ | 0.002 | | | |
| $r_3$ | 0.238 | $d_3$ | 0.066 | $n_2$ | 1.66103 | $\nu_2$ 57.1 |
| $r_4$ | 0.300 | $d_4$ | 0.038 | $n_3$ | 1.72311 | $\nu_3$ 29.3 |
| $r_5$ | 0.166 | $d_5$ | 0.327 | | | |
| $r_6$ | −0.259 | $d_6$ | 0.038 | $n_4$ | 1.72311 | $\nu_4$ 29.3 |
| $r_7$ | −0.508 | $d_7$ | 0.064 | $n_5$ | 1.66103 | $\nu_5$ 57.1 |
| $r_8$ | −0.276 | $d_8$ | 0.002 | | | |
| $r_9$ | −15.407 | $d_9$ | 0.056 | $n_6$ | 1.66103 | $\nu_6$ 57.1 |
| $r_{10}$ | −0.777 | $d_{10}$ | 0.912 | | | |
| $r_{11}$ | ∞ | $d_{11}$ | 0.013 | $n_7$ | 1.51825 | $\nu_7$ 63.9 |
| $r_{12}$ | ∞ | | | | | |

(1) $d_5 = 0.33$ $$(2) \frac{r_5 + |r_6|}{d_5} = 1.30$$

$$(3) \frac{r_3 + |r_8|}{d_3 + d_4 + d_5 + d_6} = 0.97$$

$$(4) \frac{r_3 + r_5}{r_4} = 1.35$$

$$(5) \frac{|r_6| + |r_8|}{|r_7|} = 1.05.$$

* * * * *